(12) United States Patent
Jadric et al.

(10) Patent No.: US 8,193,756 B2
(45) Date of Patent: Jun. 5, 2012

(54) VARIABLE SPEED DRIVE FOR PERMANENT MAGNET MOTOR

(75) Inventors: Ivan Jadric, York, PA (US); Zhiqiao Wu, York, PA (US); Michael S. Todd, Jacobus, PA (US); Justin Drew Warner, Harrisburg, PA (US); Shreesha Adiga Manoor, York, PA (US); Konstantin Borisov, York, PA (US); Scott Victor Slothower, Dillsburg, PA (US); Kanishk Dubey, York, PA (US); John C. Hansen, Spring Grove, PA (US)

(73) Assignee: Johnson Controls Technology Company, Holland, MI (US)

( * ) Notice: Subject to any disclaimer, the term of this patent is extended or adjusted under 35 U.S.C. 154(b) by 307 days.

(21) Appl. No.: 12/572,864

(22) Filed: Oct. 2, 2009

(65) Prior Publication Data

US 2010/0085000 A1  Apr. 8, 2010

Related U.S. Application Data

(60) Provisional application No. 61/102,687, filed on Oct. 3, 2008.

(51) Int. Cl.
  *H02P 7/00* (2006.01)
  *H02P 27/00* (2006.01)
  *G05B 5/01* (2006.01)
  *G05B 11/01* (2006.01)
(52) U.S. Cl. ......... 318/716; 318/448; 318/623; 318/629
(58) Field of Classification Search .................. 318/448, 318/623, 629, 716
See application file for complete search history.

(56) References Cited

U.S. PATENT DOCUMENTS 3,593,103 A  7/1971  Chandler et al.
(Continued)

FOREIGN PATENT DOCUMENTS

EP  0272776 A2  6/1988
(Continued)

OTHER PUBLICATIONS

Silicon Carbide npnp Thyristors, John H. Glenn Research Center, Cleveland, Ohio, downloaded from http://www.nasatech.com/Briefs/Dec00/LEW16750.html on Jan. 20, 2004, 3 pages.

(Continued)

*Primary Examiner* — Walter Benson
*Assistant Examiner* — Gabriel Agared
(74) *Attorney, Agent, or Firm* — McNees Wallace & Nurick LLC

(57) ABSTRACT

A drive system for a compressor of a chiller system includes a variable speed drive. The variable speed drive is arranged to receive an input AC voltage at a fixed AC input voltage and provide an output AC power at a variable voltage and variable frequency. The variable speed drive includes a converter connected to an AC power source providing the input AC voltage. The converter is arranged to convert the input AC voltage to a DC voltage. A DC link is connected to the converter. The DC link filters and stores the DC voltage from the converter. An inverter is connected to the DC link. A motor connectable to the compressor for powering the compressor. An active filter connected in parallel with the motor. The active filter is arranged to generate high frequency currents having a magnitude and opposite polarity, with respect to the output AC power of the variable speed drive. The high frequency currents generated by active filter substantially cancel out high frequency currents flowing into the motor.

19 Claims, 6 Drawing Sheets

U.S. PATENT DOCUMENTS

| | | | |
|---|---|---|---|
| 3,621,366 A | | 11/1971 | Duff et al. |
| 4,308,491 A | | 12/1981 | Joyner, Jr. et al. |
| 4,514,991 A | * | 5/1985 | Zinsmeyer ............... 62/209 |
| 4,587,474 A | | 5/1986 | Espelage et al. |
| 4,697,131 A | | 9/1987 | Schauder et al. |
| 4,758,771 A | | 7/1988 | Saito et al. |
| 4,761,726 A | | 8/1988 | Brown |
| 4,864,483 A | | 9/1989 | Divan |
| 4,959,602 A | | 9/1990 | Scott et al. |
| 5,038,267 A | | 8/1991 | De Doncker et al. |
| 5,081,368 A | | 1/1992 | West |
| 5,123,080 A | | 6/1992 | Gillett et al. |
| 5,127,085 A | | 6/1992 | Becker et al. |
| 5,298,848 A | | 3/1994 | Ueda et al. |
| 5,410,230 A | | 4/1995 | Bessler et al. |
| 5,483,142 A | | 1/1996 | Skibinski et al. |
| 5,499,178 A | | 3/1996 | Mohan et al. |
| 5,570,279 A | | 10/1996 | Venkataramanan |
| 5,592,058 A | | 1/1997 | Archer et al. |
| 5,625,549 A | | 4/1997 | Horvat |
| 5,646,458 A | | 7/1997 | Bowyer et al. |
| 5,747,955 A | | 5/1998 | Rotunda et al. |
| 5,757,599 A | | 5/1998 | Crane |
| 5,796,234 A | | 8/1998 | Vrionis |
| 5,869,946 A | | 2/1999 | Carobolante |
| 5,889,667 A | | 3/1999 | Bernet |
| 5,909,367 A | | 6/1999 | Change |
| 5,936,855 A | | 8/1999 | Salmon |
| 5,969,966 A | | 10/1999 | Sawa et al. |
| 6,005,362 A | | 12/1999 | Enjeti et al. |
| 6,050,083 A | | 4/2000 | Meckler |
| 6,072,302 A | | 6/2000 | Underwood et al. |
| 6,118,676 A | | 9/2000 | Divan et al. |
| 6,160,722 A | | 12/2000 | Thommes et al. |
| 6,163,472 A | | 12/2000 | Colby |
| 6,239,513 B1 | | 5/2001 | Dean et al. |
| 6,276,148 B1 | | 8/2001 | Shaw |
| 6,313,600 B1 | | 11/2001 | Hammond et al. |
| 6,348,775 B1 | | 2/2002 | Edelson et al. |
| 6,407,937 B2 | | 6/2002 | Bruckmann et al. |
| 6,487,096 B1 | | 11/2002 | Gilbreth et al. |
| 6,507,503 B2 | | 1/2003 | Norrga |
| 6,559,562 B1 | | 5/2003 | Rostron |
| 6,566,764 B2 | | 5/2003 | Rebsdorf et al. |
| 6,603,675 B1 | | 8/2003 | Norrga |
| 6,625,046 B2 | | 9/2003 | Geissler |
| 6,657,874 B2 | | 12/2003 | Yu |
| 6,658,870 B1 | | 12/2003 | Jenkins |
| 6,686,718 B2 | | 2/2004 | Jadric et al. |
| 6,704,182 B2 | | 3/2004 | Bruckmann et al. |
| 6,768,284 B2 | | 7/2004 | Lee et al. |
| 6,801,019 B2 | | 10/2004 | Haydock et al. |
| 6,861,897 B1 | * | 3/2005 | Cheng et al. ............... 327/552 |
| 7,005,829 B2 | | 2/2006 | Schnetzka |
| 7,081,734 B1 | | 7/2006 | Jadric et al. |
| 7,116,066 B2 | | 10/2006 | Lin |
| 7,135,828 B2 | | 11/2006 | Lin |
| 7,332,885 B2 | * | 2/2008 | Schnetzka et al. ....... 318/400.01 |
| 7,408,312 B2 | | 8/2008 | Itou et al. |
| 7,411,329 B2 | | 8/2008 | Murakami et al. |
| 7,555,912 B2 | | 7/2009 | Schnetzka et al. |
| 2002/0136036 A1 | * | 9/2002 | Hugget et al. ............... 363/40 |
| 2002/0176261 A1 | | 11/2002 | Norrga |
| 2003/0015873 A1 | | 1/2003 | Khalizadeh et al. |
| 2003/0052544 A1 | | 3/2003 | Yamamoto et al. |
| 2003/0133317 A1 | | 7/2003 | Norrga |
| 2003/0168919 A1 | | 9/2003 | Friedrichs et al. |
| 2003/0231518 A1 | | 12/2003 | Peng |
| 2004/0008005 A1 | | 1/2004 | Sakai et al. |
| 2004/0012986 A1 | | 1/2004 | Riggio et al. |
| 2005/0057210 A1 | | 3/2005 | Ueda et al. |
| 2005/0068001 A1 | | 3/2005 | Skaug et al. |
| 2005/0188708 A1 | * | 9/2005 | Wills et al. ............... 62/175 |
| 2005/0190511 A1 | | 9/2005 | Crane et al. |
| 2006/0208685 A1 | | 9/2006 | Schnetzka |
| 2006/0257266 A1 | * | 11/2006 | LeDoux et al. ............... 417/53 |
| 2007/0063668 A1 | | 3/2007 | Schnetzka et al. |
| 2008/0008604 A1 | * | 1/2008 | Tolbert ............... 417/364 |
| 2008/0174255 A1 | * | 7/2008 | Schnetzka et al. ............... 318/12 |
| 2008/0272667 A1 | * | 11/2008 | Ionel et al. ............... 310/156.83 |

FOREIGN PATENT DOCUMENTS

| | | |
|---|---|---|
| EP | 0283954 A2 | 9/1988 |
| EP | 0422221 A1 | 11/1989 |
| EP | 1300937 A2 | 4/2003 |
| EP | 031336 A2 | 8/2008 |
| JP | 6105563 | 9/1992 |
| JP | 5068376 | 3/1993 |
| JP | 2002176767 | 6/2002 |
| JP | 4026374 | 9/2006 |
| WO | 9314559 A1 | 7/1993 |
| WO | 9732168 A1 | 9/1997 |
| WO | 2004098038 A1 | 11/2004 |

OTHER PUBLICATIONS

IGBT with Reverse Blocking Capability, IXYS Semiconductor GmbH, 2003, pp. 1-2.

Ahmed Elasser and T. Paul Chow, Silicon Carbide Benefits and Advantages for Power Electronics Circuits and Systems, Proceedings of the IEEE, vol. 90, No. 6, Jun. 2002, pp. 969-986.

M. Takei, T. Naito and K. Ueno, The Reverse Blocking IGBT for Matrix Converter with Ultra-Thin Wafer Technology, 4 pages, Apr. 2003.

Klumpner C. et al; "Using Reverse Blocking IGBTs in Power Converters for Adjustable Speed Drives", Conference Record of the 2003 IEEE Industry applications Conference 38th IAS Annual Meeting, Salt Lake City, UT, Oct. 12-16, 2003, vol. 3 of 3 Conf. 38, pp. 1516-1523 USA.

Ozipineci B. et al.: "4H-SiC GTO Thyristor and p-n Diode Loss Models for HVDC Converter", Industry Applications Conference 2004, 39th IAS Annual Meeting, conference record of the 2004 IEEE Seattle, WA USA, Oct. 2004, Vol, 2, pp. 1238-1243.

Jue Wang et al.: "Evaluation of High-Voltage 4H-SiC Switching Devices" IEEE Transactions on Electron Devices, IEEE Service Center, Piscataway, NJ, vol. 46, No. 3, Mar. 1999.

Annabelle Van Zyl, Rene Spee, Alex Faveluke, and Shibashis Bhowmik; Voltage Sag Ride-Through for Adjustable-Speed Drives With Active Rectifiers; Nov./Dec. 1998; vol. 34, Issue No. 6; IEEE Transactions on Industry Applications.

Annette Von Jouanne, Prasad N. Enjeti, and Basudeb Banerjee; Assessment of Ride-Through Alternatives for Adjustable-Speed Drives; Jul./Aug. 1999; vol. 35, Issue No. 4; IEEE Transactions on Industry Applications.

Morimoto et al., "Expansion of Operating Limits for Permanent Magnet Motor by Current Vector Control Considering Inverter Capacity", IEEE Transactions on Industry Applications, vol. 26, Issue No. 5, Sep./ Oct. 1990.

Libor Prokop and Pavel Grasblum,"3-Phase PM Synchronous Motor Vector Control Using a 56F80x, 56F8100, or 56F8300 Device", Freescale Semiconductor: Application Note, AN1931, Rev. 3 Jan. 2005.

\* cited by examiner

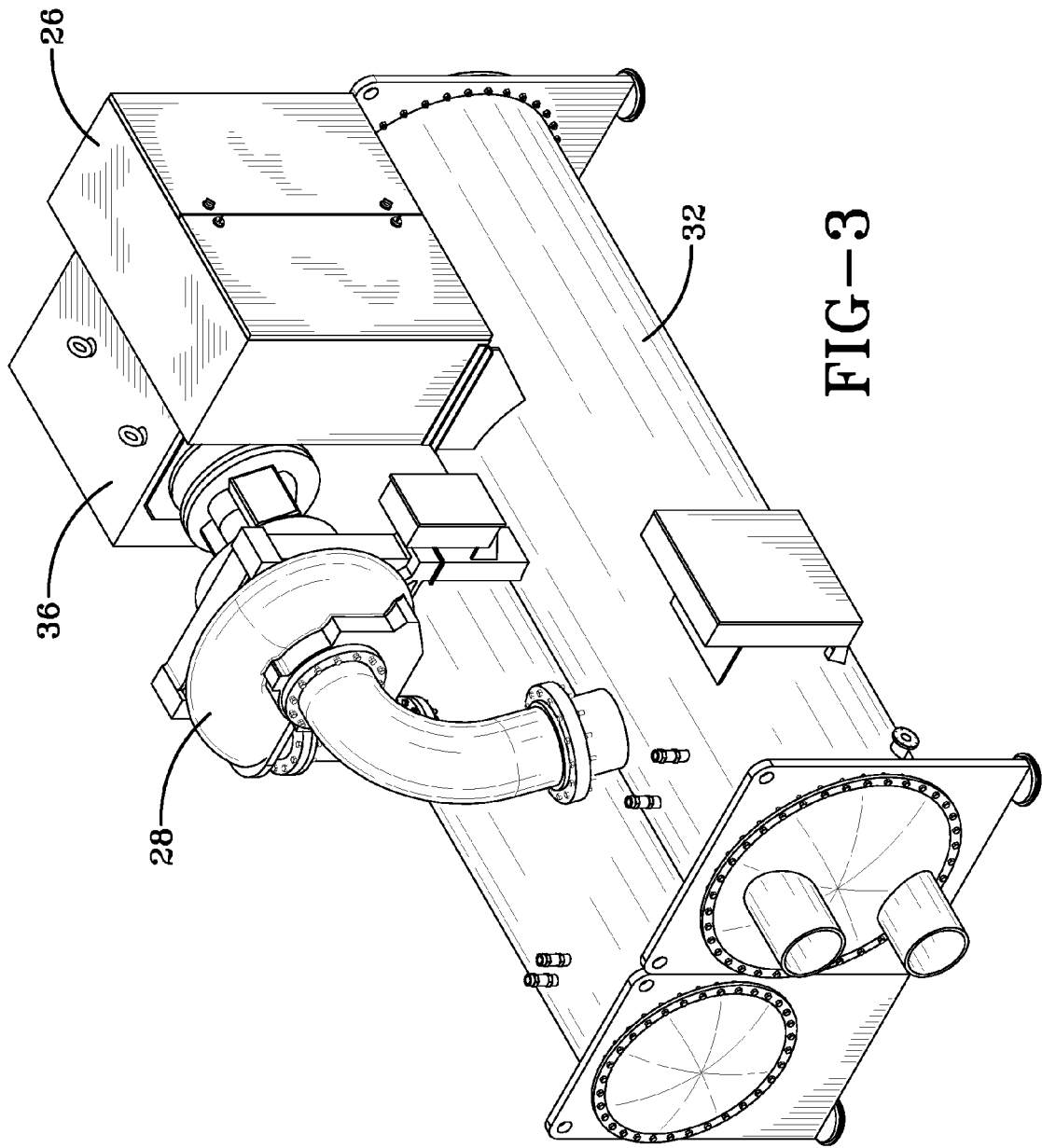

VARIABLE SPEED DRIVE FOR PERMANENT MAGNET MOTOR

This patent application claims the benefit of U.S. Provisional Patent Application No. 61/102,687, filed Oct. 3, 2008, entitled PERMANENT MAGNET MOTOR DRIVE AND CONTROLLER, for which priority is claimed and the disclosure of which is hereby incorporated by reference.

BACKGROUND

The application generally relates to a variable speed drive for a permanent magnet motor. The application relates more specifically to a variable speed drive (VSD) with an active filter for cancelling switching harmonics, and controlling a permanent magnet motor for powering a compressor in heating, ventilation, air conditioning and refrigeration (HVAC&R) systems.

Currently VSDs are used to power a variety of motor types in HVAC&R systems. Common types of motors that are used for HVAC&R applications include induction motors, switched reluctance motors, and other synchronous and DC motors capable of handling the torque and speed ranges in such HVAC&R systems.

Permanent magnet synchronous motors (PMSM) are of particular interest for use as traction motors in electric vehicle designs due to their higher efficiency and higher power density as compared to regular DC motors and AC induction motors. PMSM motors typically operate with a permanent magnet rotor. A permanent magnet rotor may be configured with surface mounted permanent magnets or with interior permanent magnets having different arrangements. The PMSM is a rotating electric machine in which the stator might be similar to a stator of an induction motor and the rotor has surface-mounted or interior permanent magnets. However, a totally different stator design for a PMSM is possible and a stator design optimization is necessary even though the stator topology might be similar to an induction machine. The use of a permanent magnet to generate a substantial air gap magnetic flux makes it possible to design highly efficient PMSMs.

A PMSM that is driven by a sinusoidal current is referred to as a PMSM while, a PMSM that is driven by a rectangular 120° electrical phase-current waveform is can be referred to as a brushless dc (BLDC) machine. The rotor structure of the PMSM and BLDC might be the same such as surface-mounted permanent magnet rotor. Both the PMSM and BLDC are driven by currents coupled with the given rotor position. The angle between the generated stator flux linkage and the rotor flux linkage, which is generated by a rotor magnet, defines the torque, and thus speed, of the motor. Both the magnitude of the stator flux linkage and the angle between the stator flux linkage and rotor flux linkage are controllable to maximize the torque or minimize the losses. To maximize the performance of PMSM and ensure the system stability, the motor requires a power electronics converter for proper operation.

For a three-phase PMSM, a standard three-phase power output stage is used, which is the same power stage that is used for AC induction motors. The power stage utilizes six power transistors with independent switching. The power transistors are switched in the complementary mode. The fundamental sine wave output is generated using a PWM technique.

To absorb harmonics created by high frequency switching of power electronic devices such as insulated gate bipolar transistors (IGBTs), the VSD 14 must include an electrical filter or filters. Passive filters connected at the output of a VSD can be used to absorb switching frequency harmonics, as well as for providing power factor correction at the VSD output. The geometry of such passive output filters is required to be very large because they draw a significant fundamental frequency reactive current.

Heretofore PMSM motors and their associated VSDs have been limited in their application in commercial and industrial scale HVAC&R systems, largely due to factors relating to relatively low performance requirements from old HVAC&R systems, higher system cost, and complicated control system design.

SUMMARY

The present invention relates to a drive system for a compressor of a chiller system. The drive system includes a variable speed drive. The variable speed drive is arranged to receive an input AC voltage at a fixed AC input voltage and provide an output AC power at a variable voltage and variable frequency. The variable speed drive includes a converter connected to an AC power source providing the input AC voltage. The converter is arranged to convert the input AC voltage to a DC voltage. A DC link is connected to the converter. The DC link filters and stores the DC voltage from the converter. An inverter is connected to the DC link. A motor connectable to the compressor for powering the compressor. An active filter connected in parallel with the motor. The active filter is arranged to generate high frequency currents having a magnitude and opposite polarity, with respect to the output AC power of the variable speed drive. The high frequency currents generated by active filter substantially cancel out high frequency currents flowing into the motor.

The present invention also relates to a drive system for a compressor of a chiller system. The drive system includes a variable speed drive. The variable speed drive is arranged to receive an input AC voltage at a fixed AC input voltage and provide an output AC power at a variable voltage and variable frequency. The variable speed drive includes a converter connected to an AC power source providing the input AC voltage. The converter is arranged to convert the input AC voltage to a DC voltage. A DC link is connected to the converter. The DC link is arranged to filter and store the DC voltage from the converter. An inverter is connected to the DC link. A motor is connectable to the compressor for powering the compressor. An active filter is connected in parallel with the motor. The active filter is arranged to generate high frequency currents having a magnitude and opposite polarity, with respect to the output AC power of the variable speed drive, to cancel a portion of high frequency currents generated in the output AC power. A passive filter connected between the variable speed drive and the motor. The passive filter is arranged to absorb at least a portion of the high frequency currents generated remaining in the output AC power following cancellation by the active filter.

BRIEF DESCRIPTION OF THE FIGURES

FIG. 3 shows an exemplary embodiment of a variable speed drive (VSD) mounted on a vapor compression system.

DETAILED DESCRIPTION OF THE EXEMPLARY EMBODIMENTS

Figure 1:
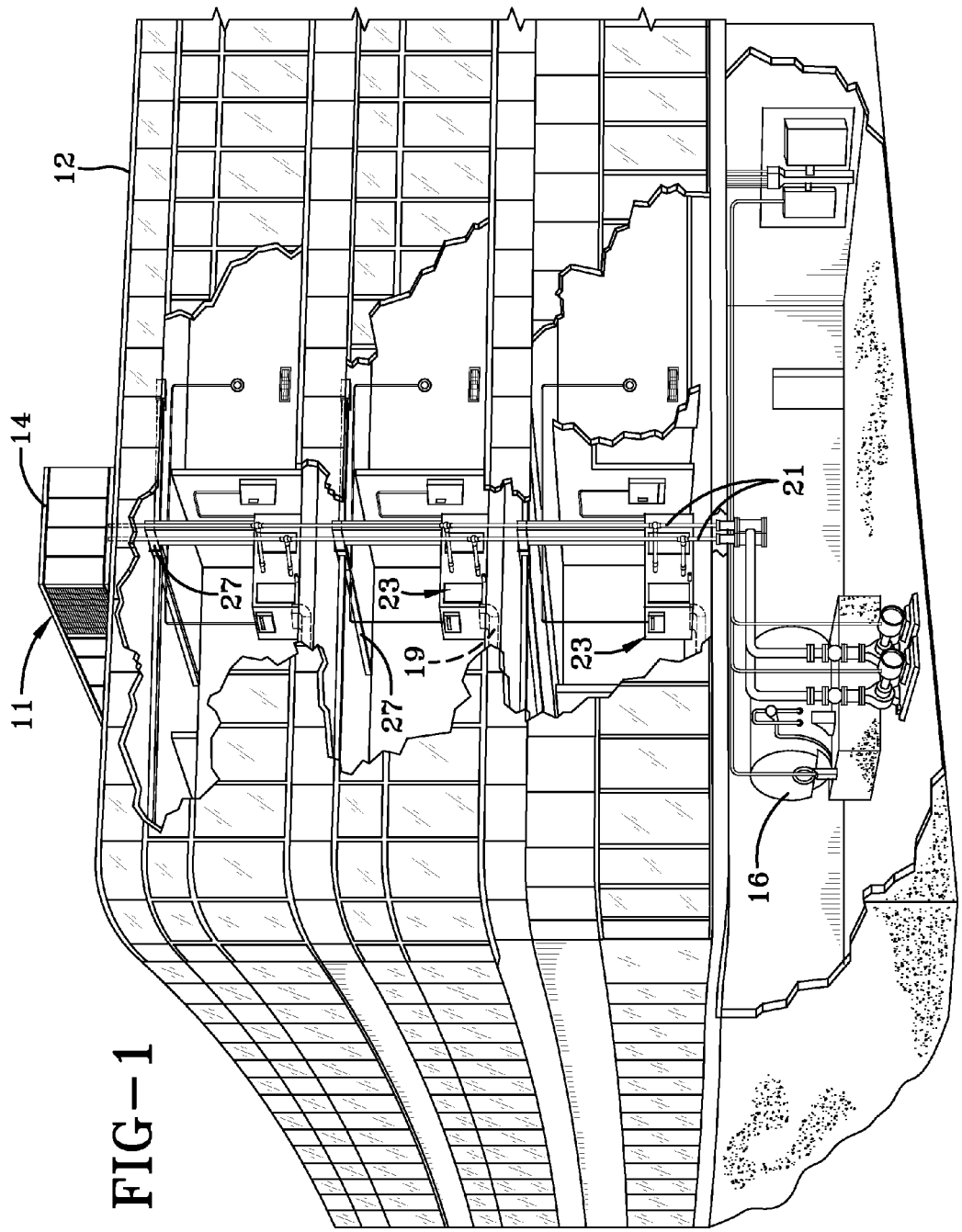
FIG. 1 shows an exemplary embodiment of a Heating, Ventilation, Air Conditioning and Refrigeration (HVAC&R) system in a commercial environment.

FIG. 1 shows an exemplary environment for a Heating, Ventilating, Air Conditioning system (HVAC system) 11 in a building 12 for a commercial setting. HVAC system 11 may include a compressor incorporated into a vapor compression system 14 that can supply a chilled liquid that may be used to cool building 12. HVAC system 11 can also include a boiler 16 used to heat building 12, and an air distribution system that circulates air through building 12. The air distribution system can include an air return duct 19, an air supply duct 27 and an air handler 23. Air handler 23 can include a heat exchanger that is connected to boiler 16 and vapor compression system 14 by conduits 21. The heat exchanger in air handler 23 may receive either heated liquid from boiler 16 or chilled liquid from vapor compression system 14, depending on the mode of operation of HVAC system 11. HVAC system 11 is shown with a separate air handler on each floor of building 12, but it will be appreciated that these components may be shared between or among floors.

Figure 2:
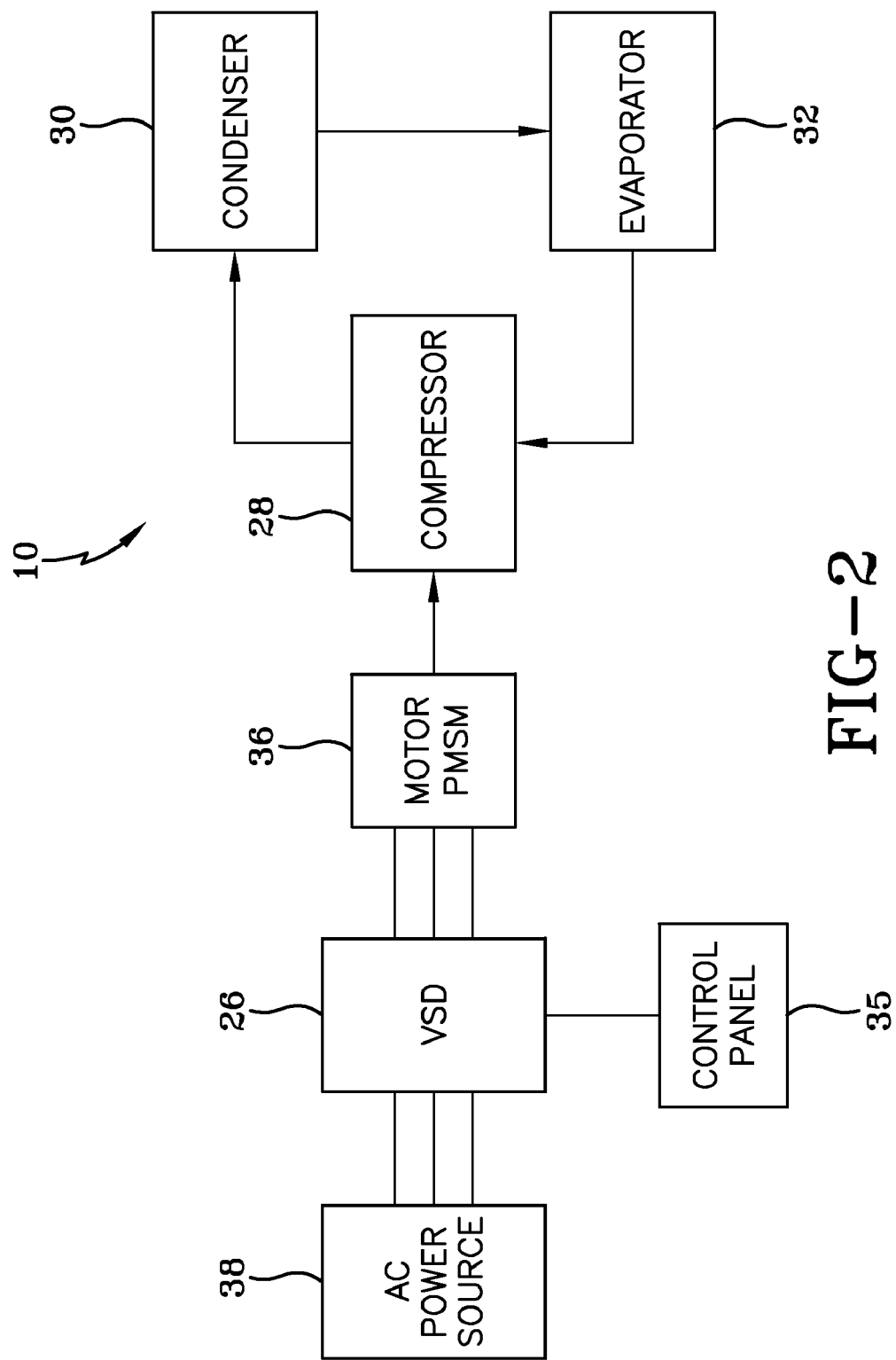
FIG. 2 schematically illustrates an exemplary embodiment of vapor compression system that may be used in the exemplary embodiment of FIG. 1.

FIG. 2 illustrates generally an exemplary configuration of a vapor compression system 14 with a variable speed drive (VSD) 26 that may be used in building 12 in FIG. 1. An AC power source 38 supplies AC power to VSD 26, which in turn, supplies AC power to a motor, for example, PMSM 36. In another embodiment, VSD 26 can power more than one motor. PMSM 36 is used to drive a corresponding compressor 28 of vapor compression system 14. Vapor compression system 14 includes compressor 28, a condenser 30, a water chiller or evaporator 32, and a control panel 35. The compressor 28, condenser 30 and evaporator 32 are connected in a closed refrigerant loop. AC power source 38 provides single phase or multi-phase (e.g., three phase), fixed voltage, and fixed frequency AC power to VSD 26 from an AC power grid or distribution system that is present at a site. AC power source 38 can supply a three phase AC voltage or nominal line voltage of 200 V, 230 V, 380 V, 460 V, or 600 V, at a nominal line frequency of 50 Hz or 60 Hz to VSD 26 depending on the corresponding AC power grid. It is to be understood that AC power source 38 can provide any suitable fixed nominal line voltage or fixed nominal line frequency to VSD 26 depending on the configuration of the AC power grid. In addition, a particular site can have multiple AC power grids that can satisfy different line voltage and line frequency requirements. For example, a site may have a 230 VAC power grid to handle certain applications and a 460 VAC power grid to handle other applications.

VSD 26 receives AC power having a particular fixed line voltage and fixed line frequency from AC power source and provides AC power to PMSM 36 at a desired voltage and desired frequency, both of which can be varied to satisfy particular requirements. VSD 26 may include the ability to provide AC power to the PMSM 36 having higher voltages and frequencies or lower voltages and frequencies than the fixed voltage and fixed frequency received from AC power source 38. PMSM 36 may have a predetermined rated voltage and frequency that is greater than the fixed AC input voltage and frequency, however the rated motor voltage and frequency may also be equal to or lower than the fixed AC input voltage and frequency.

VSD 26 may be, for example, a vector-type drive or a variable-voltage, variable frequency (VVVF) drive. Control panel 35 can include a variety of different components, such as an analog to digital (A/D) converter, a microprocessor, a non-volatile memory, and an interface board, to control operation of system 14. Control panel 35 can also be used to control the operation of VSD 26, and motor 36.

Compressor 28 compresses a refrigerant vapor and delivers the vapor to condenser 30 through a discharge line. Compressor 28 can be, for example, a screw compressor, a centrifugal compressor, a reciprocating compressor, a scroll compressor, or any other suitable type of compressor. The refrigerant vapor delivered by compressor 28 to condenser 30 enters into a heat exchange relationship with a fluid, for example, air or water, and undergoes a phase change to a refrigerant liquid as a result of the heat exchange relationship with the fluid. The condensed liquid refrigerant from condenser 30 flows through an expansion device (not shown) to evaporator 32.

Evaporator 32 may include connections for a supply line and a return line of a cooling load. A process fluid, for example, water, ethylene glycol, calcium chloride brine or sodium chloride brine, travels into evaporator 32 via return line and exits evaporator 32 via supply line. The liquid refrigerant in evaporator 32 enters into a heat exchange relationship with the process fluid to lower the temperature of the process fluid. The refrigerant liquid in evaporator 32 undergoes a phase change to a refrigerant vapor as a result of the heat exchange relationship with the process fluid. The vapor refrigerant in evaporator 32 exits evaporator 32 and returns to compressor 28 by a suction line to complete the cycle.

FIG. 3 shows an exemplary vapor compression system of an HVAC&R system. The VSD 26 can be mounted on top of the evaporator 32, and adjacent to motor 36. Motor 36 may be mounted on condenser 30 on the opposite side of evaporator 32. Output wiring (not shown) from VSD 26 is connected to motor leads (not shown) for motor 36, to power motor 36, which drives compressor 28.

Figure 4:
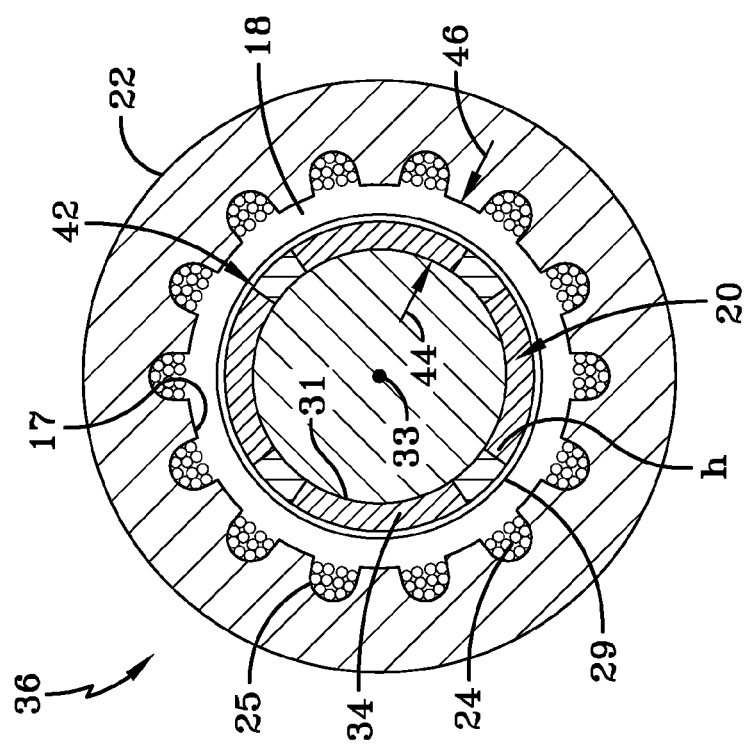
FIG. 4 is an exemplary schematic diagram of a permanent magnet synchronous motor.

Referring to FIG. 4, an exemplary PMSM 36 includes a stator portion 22. The stator portion 22 can be configured substantially similar to a stator of a conventional induction motor. Stator portion 22 includes a plurality of windings 24 disposed in slots 25 defined by a plurality of teeth 17, symmetrically distributed about an inside radius of stator portion 22 adjacent to a rotor portion 20. Rotor portion 20 is disposed axially concentrically with and inside stator portion 22, rotor portion 20 and stator portion 22 separated by an air gap 18. Rotor portion 20 may include a cylindrical steel rotor frame or cage 31 with a plurality of permanent magnets 34 arranged peripherally on rotor cage 31. Permanent magnets 34 produce a magnetic field in air gap 18.

Permanent magnets 34 may be arranged to provide multiple pole arrangements, for example 2-pole or 4-pole, in rotor portion 20. Permanent magnets 34 may be adhesively affixed to cage 32, and are enveloped by a sleeve 29 to maintain permanent magnets 34 on cage 31 when centrifugal forces act on rotor portion 20 during rotation of PMSM 36. Sleeve 29 may be constructed of carbon fiber tubular sheet material, stainless steel or other similarly flexible, high strength, magnetically non-permeable material. Air gap 18 is small relative to an effective air gap g shown between opposing arrows 44, 46. Effective air gap g includes the height h of permanent magnets 34 and sleeve 29.

Figure 5:
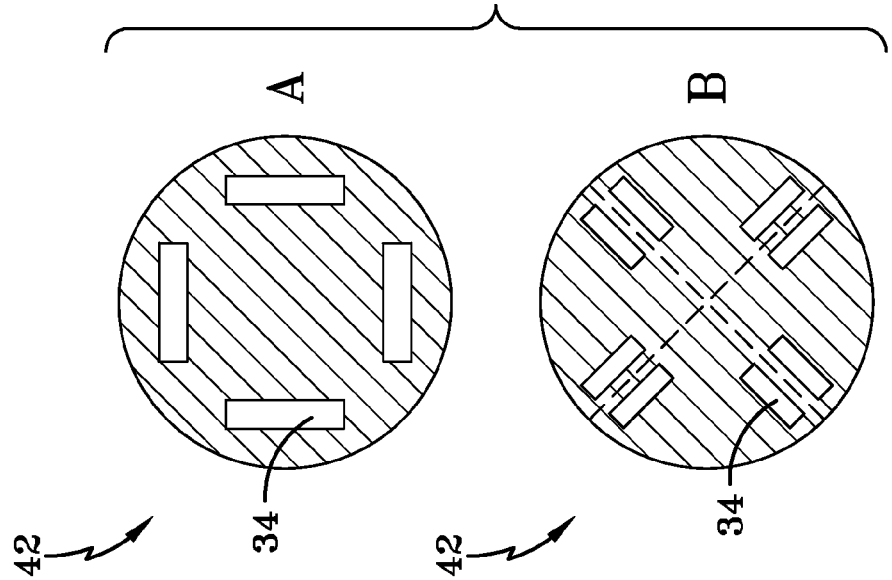
FIG. 5 is an exemplary schematic diagram of the rotor of an internal PMSM (IPM).

In another exemplary embodiment, PMSM 36 may be configured as an internal permanent magnet motor (IPM). FIG. 5 illustrates schematically an exemplary IPM rotor 42. The IPM 42 includes permanent magnets 34 implanted within rotor portion 20, rather than being mounted on the surface of rotor portion 20.

PMSMs with surface permanent magnets often use a sleeve, made of non-conductive material (e.g. carbon fiber), to encapsulate and retain the magnets and hold the rotor together against the effects of centrifugal force. Such sleeves are good thermal insulators, and therefore cause any heat developed inside the rotor to substantially remain inside the rotor, thus elevating the rotor operating temperature. Elevated temperatures can be harmful to PMSM, causing de-magnetization of permanent magnets and general deterioration of the materials used in the machine's construction. The heat developed in the rotor is, to a large extent, due to the harmonics present in the waveform of motor's stator current. The majority of these harmonics are frequencies that are multiples of PWM switching frequency used for the inverter of VSD 26.

It is therefore preferable to design an output filter which will filter switching frequency harmonics only (no fundamental, i.e. no power factor correction). This can be a simple second-order LC filter, whose break frequency is somewhere between the maximum fundamental output frequency and the switching frequency of the inverter of VSD 26. However, even this kind of filter may still contribute significantly to the cost and volume of VSD 26. One novel solution is to provide an active filter 60 (FIG. 6) that is configured to capture the current harmonics at PWM and higher frequencies. Active filter 60 is implemented with very fast semiconductors (MOSFETs or equivalent devices), and switches at a very high switching frequency, at least an order of magnitude higher than the switching frequency of the inverter of VSD 26. Active filter 60 operates as a parallel active filter. Active filter 60 is connected in parallel to PMSM, and generates high frequency currents which are of the same magnitude, but opposite polarity, with respect to the high frequency currents generated by the output of VSD 26. The high frequency currents generated by active filter 60 cause the cancellation of high frequency currents flowing in PMSM windings, thus minimizing the heating effects on the rotor.

Figure 6A:
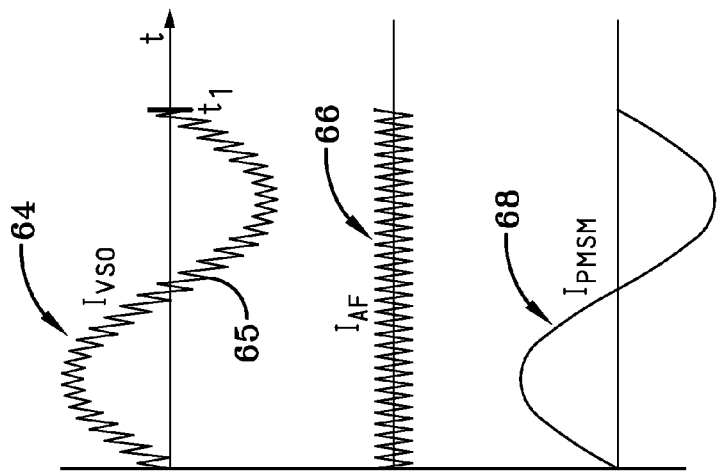
FIG. 6A shows a set of current waveforms related to the active filter shown in FIG. 6.
Figure 6:
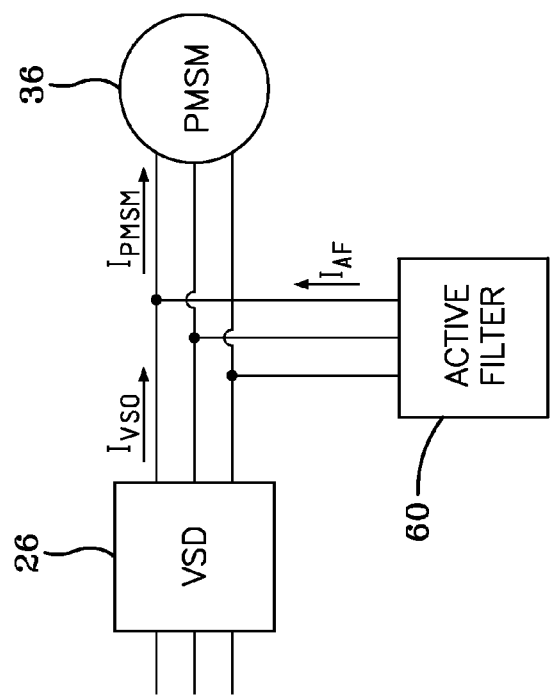
FIG. 6 is an exemplary embodiment of an active filter implemented with the VSD and PMSM.

Referring to FIG. 6A, three waveforms, $I_{VSD}$ 64, $I_{AF}$ 66 and $I_{PMSM}$ 68 are shown to indicate corresponding currents $I_{VSD}$ 64, $I_{AF}$ 66 and $I_{PMSM}$ 68 indicated in the circuit of FIG. 6. $I_{VSD}$ 64 represents the output current waveform of VSD 26. As illustrated in FIG. 6A, $I_{VSD}$ 64 includes a fundamental periodic sinewave of period t1, with a ripple current 65 superimposed thereon. Ripple current 65 has a frequency that is a harmonic of the PWM switching frequency. The curve for $I_{AF}$ 66, indicated below $I_{VSD}$ 64 in FIG. 6A, represents the output current of active filter 60. $I_{AF}$ 66 is essentially ripple current 65, shifted 180 degrees out of phase with respect to $I_{AF}$ 66, such that the combination of the two currents will result in cancellation of substantially all of ripple current 65 from $I_{VSD}$, resulting in current waveform $I_{PMSM}$ at the input to PMSM 36. $I_{PMSM}$ may include minor distortion in the sinusoidal current waveform, but is substantially free of harmonic currents.

Figure 7A:
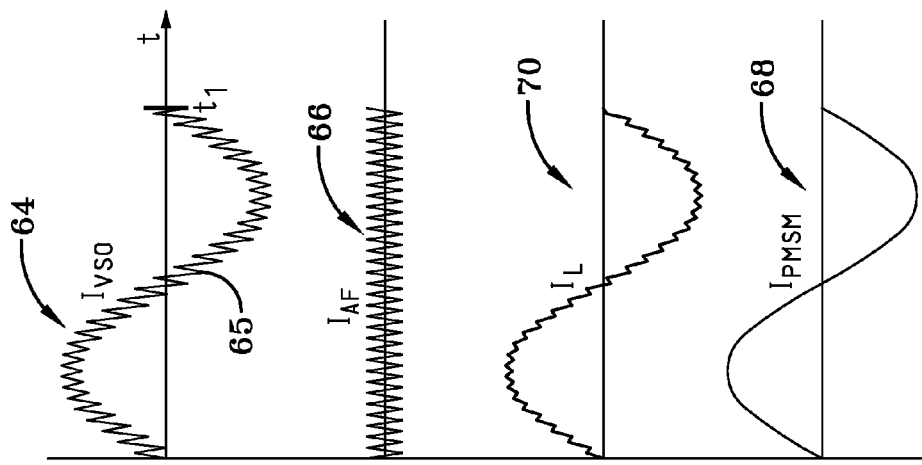
FIG. 7A shows a set of current waveforms related to the active filter and passive filter arrangement shown in FIG. 7.
Figure 7:
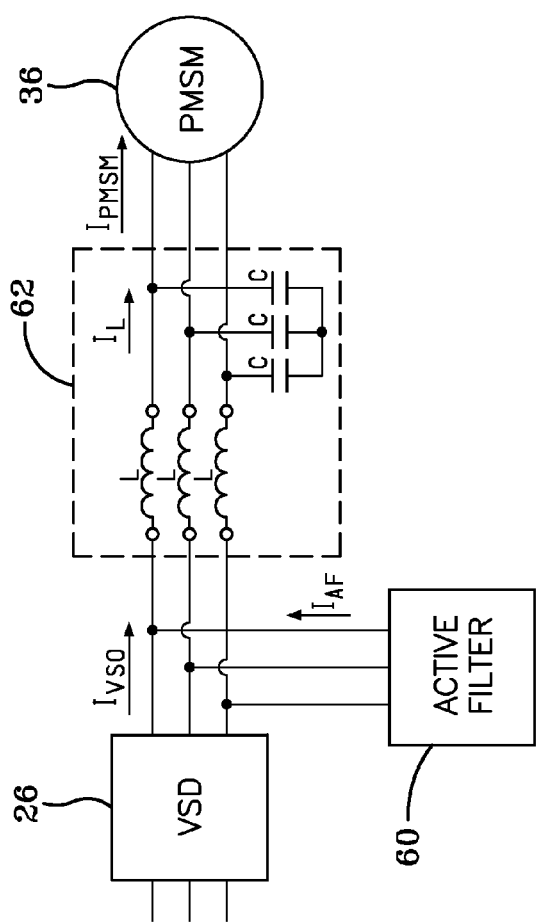
FIG. 7 is an exemplary embodiment of an active filter and passive filter arrangement implemented with the VSD and PMSM.

Referring next to FIGS. 7 and 7A, in another exemplary embodiment, active filter 60 may be combined with a passive LC filter 62. In this embodiment, active filter 60 cancels a portion of the high frequency currents generated by VSD 26 (e.g., currents at switching frequency and twice the switching frequency), while most of the remaining high frequency currents generated by VSD 26 would be absorbed by passive LC filter 62. The combination of active filter 60 and passive filter 62 may result in an optimum cost and components size rations, i.e., active components vs. passive components, for an HVACR system. The sequence of the placement of active and passive filters can function in alternate arrangements. In other words, active filter 60 may be located in the circuit before passive filter 62, or passive filter 62 may be located before active filter 60.

FIG. 7A illustrates the waveforms, $I_{VSD}$ 64, $I_{AF}$ 66, $I_{PMSM}$ 68 and $I_L$ 70 flowing in the circuit of FIG. 7. $I_{VSD}$ 64 includes a fundamental periodic sinewave of period t1, with a ripple current 65 superimposed thereon. Ripple current 65 has a frequency that is a harmonic of the switching frequency. The curve for $I_{AF}$ 66, indicated below $I_{VSD}$ 64 in FIG. 7A, represents the output current of active filter 60. In the example of FIG. 7, IAF 66 is a current waveform which is the opposite of only some of the harmonics present in ripple current 65, such that when $I_{AF}$ and $I_{VSD}$ are combined, ripple current 65 is reduced but not substantially eliminated. The resultant current waveform of combining $I_{AF}$ and $I_{VSD}$ flows through inductors L in series with PMSM 36. $I_L$, shown beneath $I_{AF}$ in FIG. 7A, is still partially distorted due to a portion of ripple current 65 being present after combining $I_{AF}$ and $I_{VSD}$. Capacitors C in passive filter 62 filter the higher frequency harmonic currents present in $I_L$, resulting in current waveform $I_{PMSM}$ 68 at the input to PMSM 36. $I_{PMSM}$ 68 may include minor distortion in the sinusoidal current waveform, but is substantially free of harmonic currents.

While only certain features and embodiments of the invention have been illustrated and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:
1. A drive system for a compressor of a chiller system, the drive system comprising:
a variable speed drive, the variable speed drive being configured to receive an input AC voltage at a fixed AC input voltage and provide an output AC power at a variable voltage and variable frequency, the variable speed drive comprising:
a converter connected to an AC power source providing the input AC voltage, the converter being configured to convert the input AC voltage to a DC voltage;

a DC link connected to the converter, the DC link being configured to filter and store the DC voltage from the converter; and at least one inverter connected to the DC link;

a motor connectable to the compressor for powering the compressor; and an active filter connected between the at least one inverter and the motor, the active filter configured to generate high frequency currents having a magnitude and opposite polarity, with respect to the output AC power of the variable speed drive, the high frequency currents generated by active filter substantially cancelling high frequency currents flowing into the motor.

2. The drive system of claim 1, wherein the motor is a permanent magnet synchronous motor.

3. The drive system of claim 2, wherein the permanent magnet synchronous motor further comprises a plurality of permanent magnets arranged in multiple pole arrangements in a rotor portion.

4. The drive system of claim 3, wherein the plurality of permanent magnets being adhesively affixed to a rotor cage, the plurality of permanent magnets enveloped by a sleeve portion to maintain the plurality of permanent magnets on the rotor cage when centrifugal forces act on rotor portion during rotation.

5. The drive system of claim 4, wherein the rotor cage is a cylindrical steel rotor cage.

6. The drive system of claim 4, wherein the sleeve portion comprises a flexible, high strength, magnetically non-permeable material.

7. The drive system of claim 6, wherein the material is carbon fiber tubular sheet material or stainless steel.

8. A drive system for a compressor of a chiller system, the drive system comprising:

a variable speed drive, the variable speed drive being configured to receive an input AC voltage at a fixed AC input voltage and provide an output AC power at a variable voltage and variable frequency, the variable speed drive comprising:

a converter connected to an AC power source providing the input AC voltage, the converter being configured to convert the input AC voltage to a DC voltage;

a DC link connected to the converter, the DC link being configured to filter and store the DC voltage from the converter; and at least one inverter connected to the DC link;

a motor connectable to the compressor for powering the compressor; and an active filter connected between the at least on inverter and the motor, the active filter configured to generate high frequency currents having a magnitude and opposite polarity, with respect to the output AC power of the variable speed drive to cancel a portion of high frequency currents generated in the output AC power;

a passive filter connected between the variable speed drive and the motor, the passive filter configured to absorb at least a portion of the high frequency currents generated remaining in the output AC power following cancellation by the active filter.

9. The drive system of claim 8, wherein the passive filter is an LC filter comprising at least one inductor and at least one capacitor, the at least one inductor connected in series with the motor and the at least one capacitor connected in parallel with the at least one inductor and the motor.

10. The drive system of claim 8, wherein the high frequency currents generated in the active filter are limited to currents at switching frequency and twice the switching frequency.

11. The drive system of claim 8, wherein the passive filter is connected between variable speed drive and the active filter.

12. The drive system of claim 8, wherein the passive filter is connected between the active filter and the motor.

13. The drive system of claim 8, wherein an output current of the variable speed drive comprises a fundamental periodic sinewave having a ripple current superimposed thereon, the ripple current comprising a harmonic of the switching frequency; and wherein an output current of the active filter, when combined with the output current reduces a portion of the ripple current and a resultant current waveform flows through the at least one inductor; the at least one capacitors in passive filter configured to filter higher frequency harmonic currents flowing in the at least one inductor to substantially remove any remaining harmonic currents present in the resultant current waveform.

14. The drive system of claim 8, wherein the motor is a permanent magnet synchronous motor.

15. The drive system of claim 14, wherein the permanent magnet synchronous motor further comprises a plurality of permanent magnets arranged in multiple pole arrangements in a rotor portion.

16. The drive system of claim 15, wherein the plurality of permanent magnets being adhesively affixed to a rotor cage, the plurality of permanent magnets enveloped by a sleeve portion to maintain the plurality of permanent magnets on the rotor cage when centrifugal forces act on rotor portion during rotation.

17. The drive system of claim 16, wherein the rotor cage is a cylindrical steel rotor cage.

18. The drive system of claim 16, wherein the sleeve portion comprises a flexible, high strength, magnetically non-permeable material.

19. The drive system of claim 18, wherein the material is carbon fiber tubular sheet material or stainless steel.

* * * * *